US010422909B2

(12) United States Patent
Marshall et al.

(10) Patent No.: US 10,422,909 B2
(45) Date of Patent: Sep. 24, 2019

(54) APPARATUS AND METHOD FOR STEERING OF A SOURCE ARRAY

(71) Applicants: Dean Marshall, Morpeth (GB); Dale Marshall, Morpeth (GB)

(72) Inventors: Dean Marshall, Morpeth (GB); Dale Marshall, Morpeth (GB)

(*) Notice: Subject to any disclaimer, the term of this patent is extended or adjusted under 35 U.S.C. 154(b) by 153 days.

(21) Appl. No.: 15/505,230

(22) PCT Filed: Jun. 29, 2015

(86) PCT No.: PCT/GB2015/051889
§ 371 (c)(1),
(2) Date: Feb. 20, 2017

(87) PCT Pub. No.: WO2016/027055
PCT Pub. Date: Feb. 25, 2016

(65) Prior Publication Data
US 2017/0199293 A1 Jul. 13, 2017

(30) Foreign Application Priority Data

Aug. 21, 2014 (GB) .................................. 1414872.0
Nov. 28, 2014 (GB) .................................. 1421173.4

(51) Int. Cl.
G01V 1/38 (2006.01)
B63B 21/66 (2006.01)

(52) U.S. Cl.
CPC ............ G01V 1/3826 (2013.01); B63B 21/66 (2013.01)

(58) Field of Classification Search
CPC ........................... G01V 1/003; G01V 2210/16
See application file for complete search history.

(56) References Cited

U.S. PATENT DOCUMENTS

| 4,524,740 | A  | * | 6/1985  | Brockhaus  | F02D 11/105 |
|           |    |   |         |            | 123/342     |
| 7,415,936 | B2 | * | 8/2008  | Storteig   | B63B 21/66  |
|           |    |   |         |            | 114/254     |
| 7,804,738 | B2 | * | 9/2010  | Storteig   | G01V 1/3861 |
|           |    |   |         |            | 367/16      |
| 7,957,220 | B2 | * | 6/2011  | Howlid     | G01V 1/3826 |
|           |    |   |         |            | 367/16      |
| 8,593,905 | B2 | * | 11/2013 | Gagliardi  | G01V 1/38   |
|           |    |   |         |            | 367/20      |
| 8,792,298 | B2 | * | 7/2014  | Toennessen | B63B 21/66  |
|           |    |   |         |            | 114/249     |

(Continued)

Primary Examiner — Krystine E Breier
(74) Attorney, Agent, or Firm — Kimberly O Snead, Esq.

(57) ABSTRACT

A marine survey apparatus comprises a plurality of cables towed by a vessel, the plurality of cables including two deflected tow cables each connected to the towing vessel. A primary surveying tool is attached to a cable, which cable is attached to the towing vessel and a spread rope. The deflected cables are connected to one another by the spread rope. The apparatus further comprises a water engaging drag device, which is attached to and trailed behind the spread rope. An elongate flexible element extends between the drag device and the vessel. The apparatus includes a control means for controlling the elongate flexible member and the drag device attached thereto. The survey apparatus is steerable to position the at least survey tool in a desired location by controlling the at least one drag device.

20 Claims, 8 Drawing Sheets

(56) References Cited

U.S. PATENT DOCUMENTS

| | | | |
|---|---|---|---|
| 8,794,171 B2* | 8/2014 | Jauncey | B63B 39/06 |
| | | | 114/162 |
| 8,891,331 B2* | 11/2014 | Barker | G01V 1/3826 |
| | | | 114/244 |
| 9,217,801 B2* | 12/2015 | Goldner | G01H 9/00 |
| 9,340,261 B2* | 5/2016 | Macrae | B63B 21/50 |
| 2009/0211388 A1* | 8/2009 | Meysenburg | F16H 59/10 |
| | | | 74/473.15 |
| 2010/0226204 A1 | 9/2010 | Gaglardi et al. | |
| 2012/0257474 A1 | 10/2012 | Cambois et al. | |
| 2013/0215713 A1 | 8/2013 | Haartland | |
| 2014/0169125 A1* | 6/2014 | Voisin | G01V 1/38 |
| | | | 367/18 |
| 2016/0297506 A1* | 10/2016 | Duckworth | B63G 8/08 |

* cited by examiner

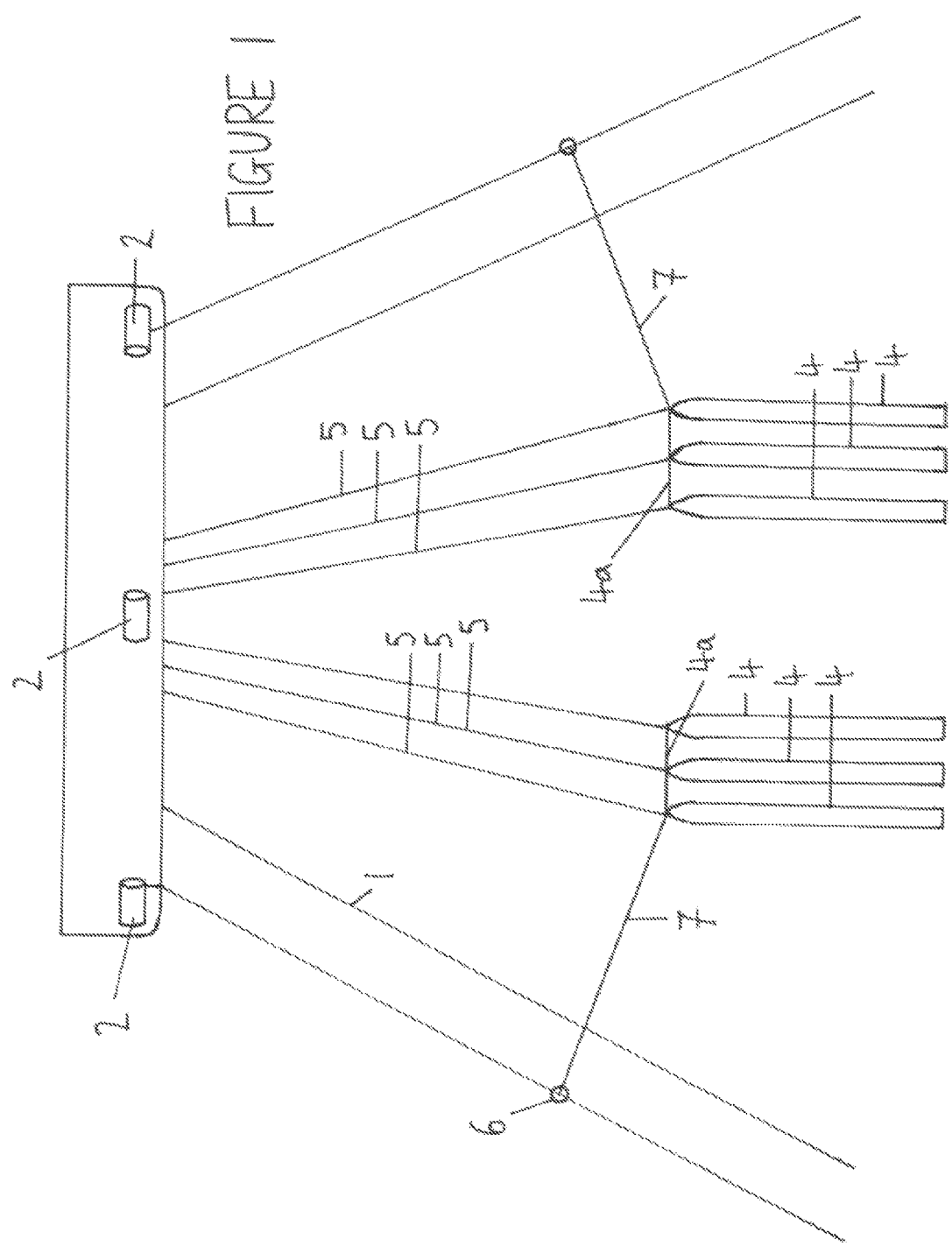

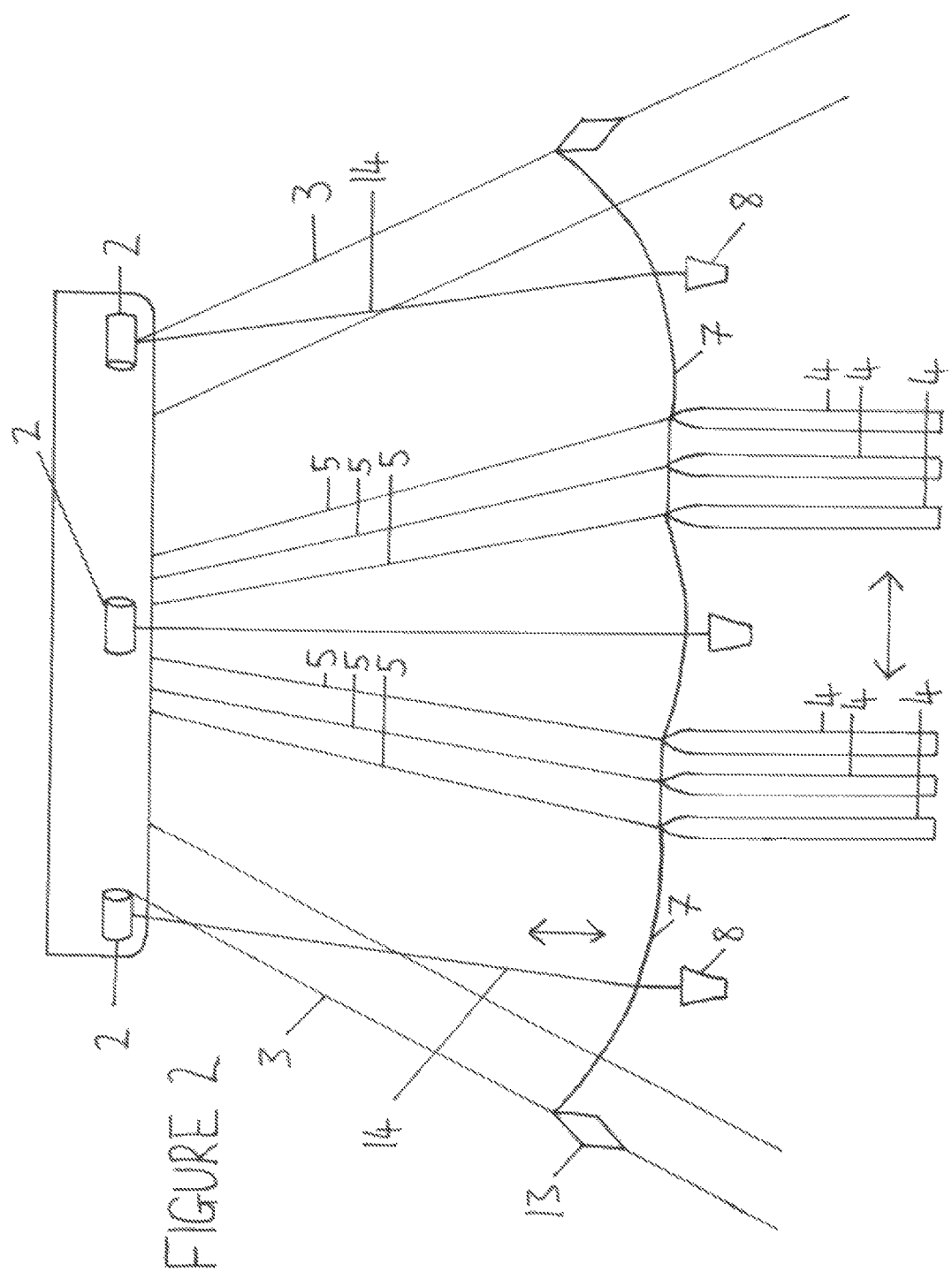

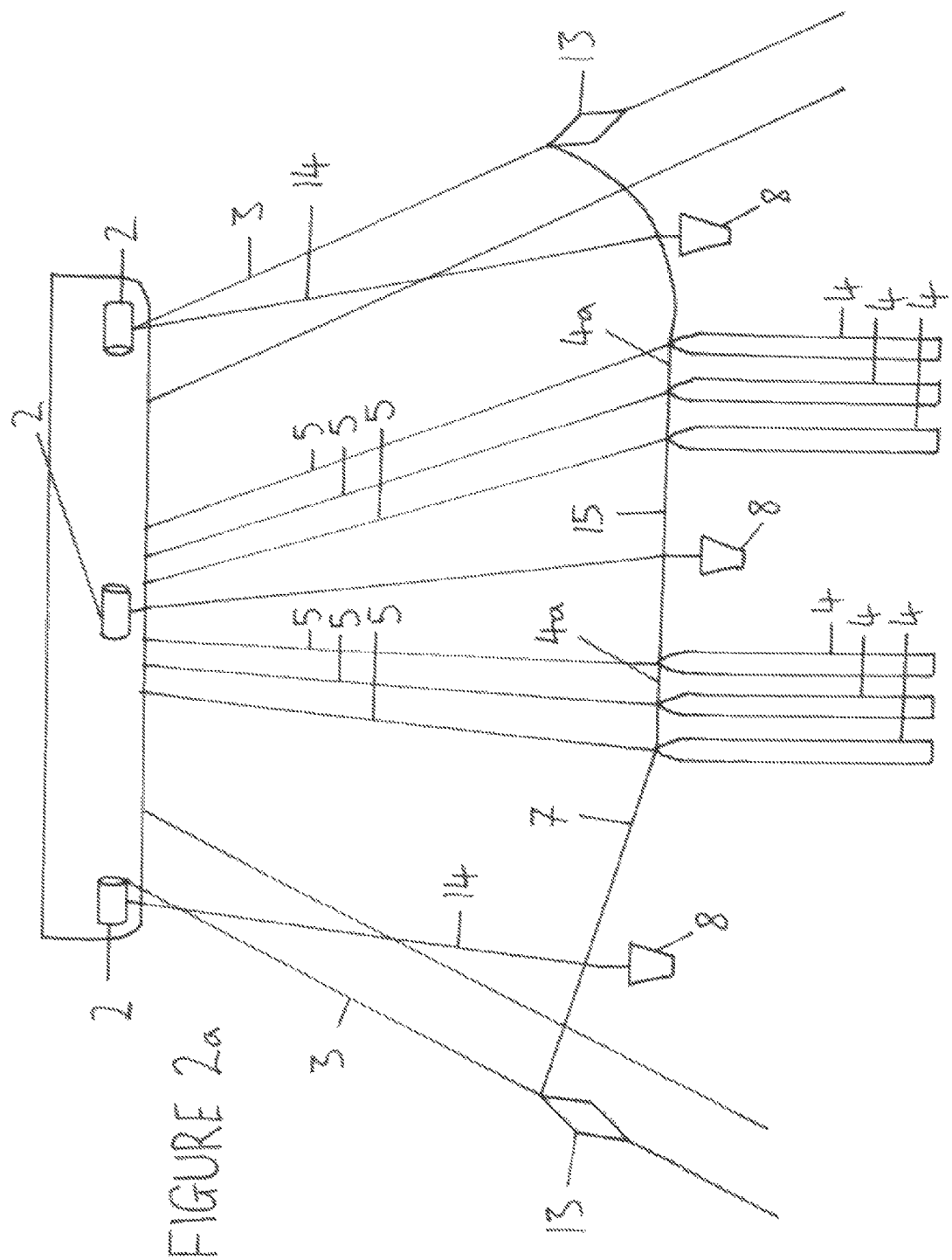

APPARATUS AND METHOD FOR STEERING OF A SOURCE ARRAY

FIELD OF THE INVENTION

The present invention relates to marine geophysical surveying and in particular to an apparatus and method for steering a source array.

BACKGROUND OF THE INVENTION

Marine geophysical surveying is used to assess amongst other things, the topography of the seabed, the location of mineral deposits such as oil and gas, and more recently to assess the quantity of mineral deposits at a particular location. The most commonly used form of geophysical surveying used employs seismic sources which produce sound waves mechanically using high pressure air devices.

When such seismic surveying first took place a single seismic source and following streamer were towed through a body of water by a towing vessel with the seismic source being activated at intervals, the streamer detecting reflected sound from the seabed. Such a system is known as a 2 dimensional system since the survey is conducted along the path taken by the streamer cable. Such surveys allowed information to be gathered that would not previously have been possible. However, two dimensional systems have significant imitations. For example, if a mineral deposit were found the information gleaned by the 2 dimensional survey would approximate to a slice through the mineral deposit.

In order to improve seismic surveying a three dimensional system was developed. In this system a rig comprising multiple cables, often twelve or more, and supporting multiple seismic sources is towed by a vessel.

In the case of the mineral deposit referred to above, the information gleaned from a three dimensional survey can be considered to approximate to multiple slices through the mineral deposit.

As oil and gas becomes more scarce there is interest in surveying previously exploited oil and gas wells, since amounts of such mineral resources may be present that would flow for profitable extraction.

A new system of geophysical surveying, known as four dimensional or time elapsed surveying has been developed. In four dimensional/time elapsed surveying the fourth dimension is time, that is three dimensional surveys are repeated from time to time. If conducted accurately, the extent to which an oil well is being depleted can be measured. The information gleaned from such surveys allows resources to be directed efficiently.

However, a four dimensional survey is only useful if it is possible to conduct almost exactly the same three dimensional survey multiple times separated by time. To achieve this the seismic sources must be fired when they are in substantially the same location when each survey takes place. This can only be achieved by steering the cable rig.

A number of steerable streamer cable rigs have been proposed.

WO2011116118 describes a system for steering actively a seismic survey array. A streamer rig includes a steering system comprises a capstan having cables extending left and right therefrom so that when the right hand cable is pulled in the left hand cable is paid out and vice versa. One of these cables is attached to a lead-in cable that forms part of the rig and is to one side of the streamer array.

The problem associated with this type of arrangement is that the capstan is part of the rig which is dragged through the water. The capstan must therefore operate in a very harsh environment and is hence liable to breakdown.

GB2436456 describes an alternative arrangement where the cables supporting the seismic sources are connected to a winch or capstan on the towing vessel. Actuation of the winch or capstan changes the length of the streamer cables, which changes the position of the array relative to the towing vessel.

GB2414804 describes another alternative arrangement where the cables supporting the seismic sources are connected to outwardly situated lead in cables and winches or capstans on the towing vessel arranged so that when one cable is pulled in by one of the winches/capstans, the other cable is paid out by the other winch capstan.

Each of the above mentioned rigs steers the streamer cables by changing the length of a cable that forms part of the rig.

It would be desirable to provide an alternative means of steering a rig so as to be able to perform four dimensional surveys.

SUMMARY OF THE INVENTION

According to the invention there is provided a marine survey apparatus comprising a plurality of cables towed by a vessel, the plurality of cables including two deflected tow cables each connected to the towing vessel; at least one primary surveying tool attached to a cable, which cable is attached to the towing vessel and at least one spread rope, wherein the deflected cables are connected to one another by the at least one spread rope, wherein the apparatus further comprises at least one water engaging drag device, the at least one drag device attached to and trailed behind the at least one spread rope, an elongate flexible member extending between the vessel and the or each drag device, wherein the apparatus includes a control means for controlling the elongate flexible member and the drag device attached thereto, the survey apparatus being steerable to position the at least one survey tool in a desired location by controlling the at least one drag device.

Preferably, the elongate flexible element extends between each drag device and the vessel and wherein the length of elongate flexible element is controllable by the control means, the survey apparatus being steerable by controlling said length of the elongate flexible element.

It is preferred that the marine survey apparatus comprises at least two drag devices attached to the at least one spread rope at spaced apart locations between the deflected tow cables.

Each elongate flexible element may be attached to a winder mounted on the vessel.

Each cable winder may be one of: a winch, a capstan and a windlass.

The elongate flexible element may be attached to a coupling that is slidably mounted on the vessel, and wherein sliding of the coupling changes the length of the elongate flexible element between the stern of the vessel and the drag device.

The elongate flexible element may be one of: a rope, a cable and a chain.

The drag device may be a drogue or sea anchor.

Preferably, the drogue or sea anchor is of a fixed configuration.

The drogue or sea anchor may be of a variable configuration, providing a variable amount of drag.

The elongate flexible member may be a Bowden cable and wherein the inner slidable element is operatively connected to the drogue or sea anchor to vary the configuration thereof.

The marine survey apparatus may comprise two primary surveying tools, wherein the primary surveying tools are spaced apart and wherein a drag device is situated between the two primary surveying tools.

The marine survey apparatus may comprise two sets of primary surveying tools, each set spaced apart from one another, the drag device situated between the two sets of primary surveying tools.

The surveying tools or sets of primary surveying tools may be attached to each other by a spread rope.

A plurality of tow cables may each be attached to the towing vessel and a spread rope.

The marine survey apparatus may include at least one secondary surveying tool, the at least one secondary surveying tool attached to one of the tow ropes and the at least one spread rope and wherein the at least one secondary surveying tool is towed behind the primary surveying tool.

The survey apparatus may be a seismic survey apparatus and wherein the primary survey tool is a sonar source and the secondary survey tool is a sonar sensor.

The marine survey apparatus may further comprise a controller configured to input control signals to the control means.

The controller may be configured is receive signals from a navigation system.

The marine survey apparatus may further comprise position locators associated with the seismic sources and/or streamers.

According to another aspect of the invention there is provided a method of conducting a marine survey using a marine survey apparatus according to the first aspect of the invention, comprising the steps of:

navigating a vessel towing the marine survey apparatus through a previously surveyed area;

inputting position information from a previous survey into the controller;

controlling the control means to adjust the said length of the elongate flexible element, to position the survey tools in a desired location.

BRIEF DESCRIPTION OF THE DRAWINGS

In the Drawings, FIGS. 2 to 6 illustrate preferred embodiments of the invention, and are by way of example:

FIG. 1 is a plan view of a conventional source separation rig used in multi-streamer seismic surveying;

FIG. 2 is a plan view of a steerable multi-steamer source spread configuration according to the invention;

FIG. 2a is a plan view of the steerable multi-streamer source spread configuration shown in FIG. 2, using winched drag devices method to achieve active source steering;

FIG. 3 is a plan view of a gunboat's dual source spread configuration incorporating the winched drag devices method to achieve active source steering;

FIG. 4 is a plan view of a multi streamer spread configuration incorporating the winched drag devices method to achieve steerable streamer separations;

FIG. 5 is an aerial view of a gun boat's single source spread configuration incorporating the winched drag devices method to achieve active source steering;

FIG. 6 is a schematic representation of the drag device; and

DETAILED DESCRIPTION OF THE DRAWINGS

Figure 3:
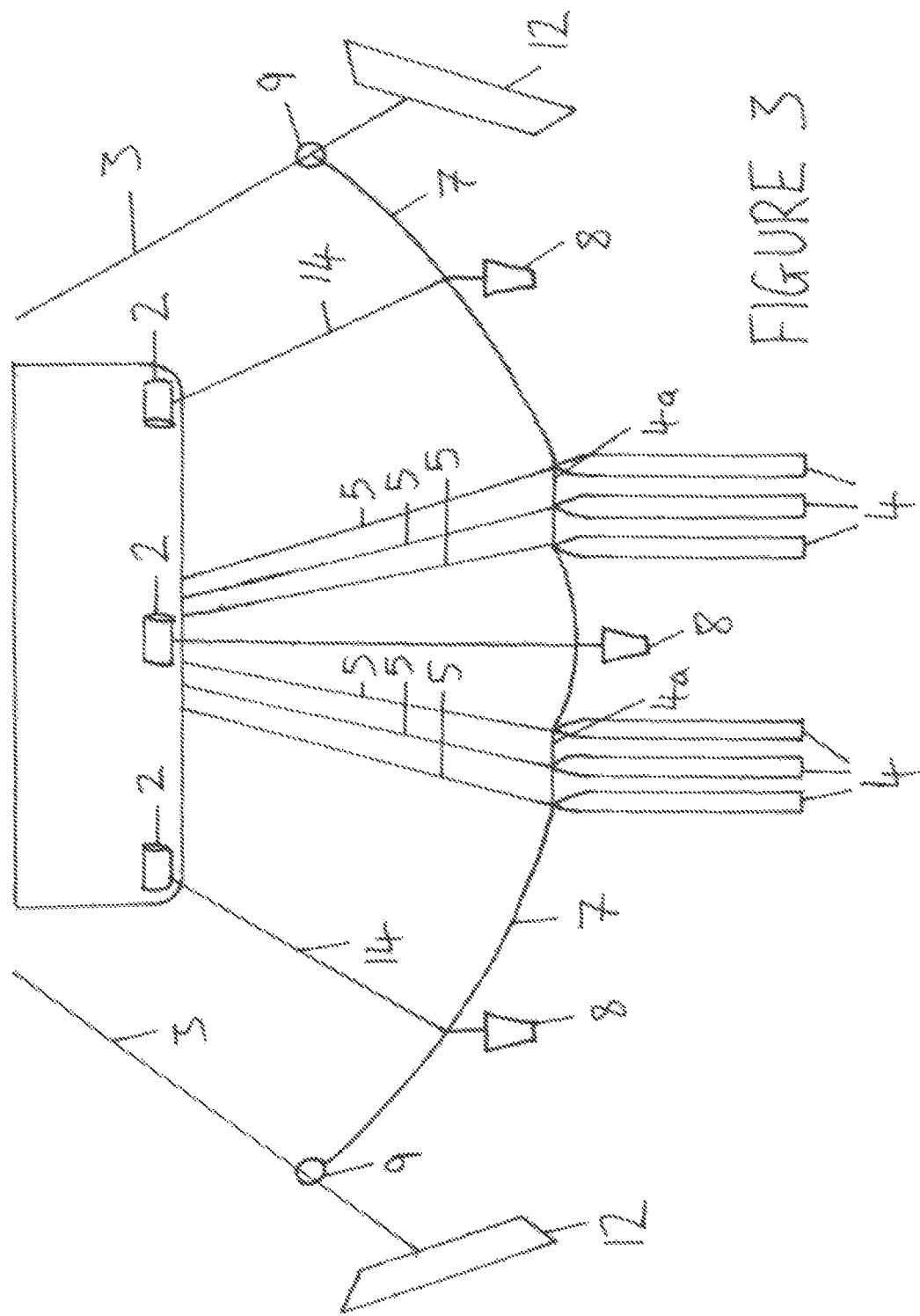

Referring now to FIG. 1, there is shown a seismic source rig behind which seismic streamers are drawn. The rig comprises streamer lead-ins 1 to each side of seismic sources 4. The rig comprises two groups of three sources 4, each towed by a gun umbilical 5. Each seismic source 4 of a group of three is attached to a tow member 4a and the outer side of the floated drag device is attached to an outer speed rope 7, which is attached to a slider 6. The slider 6 is itself is slidably mounted on the streamer lead in 1.

The streamer lead-ins 1 and the gun umbilicals 5 are attached to a towing vessel V. Each source provides information along the path that it follows. By grouping multiple sources together, as shown in FIG. 1, information from multiple adjacent paths can be gathered.

In order to create four dimensional or time elapsed surveys it is necessary to be able to steer the rig so that the rig can be positioned to allow a current survey is conducted in essentially the same place that the previous surveys were conducted, that is the seismic sources 4 must be positioned such that they can be fired in substantially the same location in the current survey as they were in the previous survey. Ideally, in a current survey the sources are located to within one meter of their location in the previous survey.

The apparatus known in the art for steering the rig comprise adjusting the length of cables forming a part of the rig. The present invention takes a different approach. In the present invention different parts of the rig are subjected a controllable drag force.

FIG. 2 illustrates an example of the present invention. The rig differs from that shown in FIG. 1 in that the two groups of seismic sources 4 are attached together by a central spread rope 15 and by the provision of drag devices 8. A drag device 8 is attached to each of the spread ropes 7 and to a drag control cable 14 which extends from the vessel V. In the illustrated embodiment on board the vessel V the control cable 14 is attached to a winch 2. Each of the spread ropes 7 is bowed. By configuring the rig such that the spread ropes are bowed when the rig is running straight behind the vessel, more facility for moving the sources to the left and right of the centre line is provided.

As can be seen from FIG. 2a, by increasing the length of the control cable 14 on the right, drag device causes the outer spread rope 7 to bow more than in the configuration shown in FIG. 2. This causes the whole rig to move away from the vessel centre line to the right because bowing of the spread rope 7 which decreases the distance between the stopper 13 and the seismic source 4 most proximate thereto, pulling the seismic sources to the right. If the control cable 14 to the left is shortened, this has the effect of reducing the bow in the left hand spread rope 7, which again results in the seismic source 4 moving to the right.

To steer the whole rig away from the vessel centre line to the left, the drag control cable 14 on the right is drawn in to increase the distance between the stopper 13 and the seismic source 4 most proximate thereto. The drag control cable 14 on the left hand side of the rig is then paid out, causing the outer spread rope 7 to the left of the rig to bow, thereby decreasing the distance between the left hand stopper 13 and the seismic source 4 most proximate thereto, which causes the whole rig to move away from the centre line to the left.

If it is desired to move both the groups of seismic sources 4 closer together, the drag control cable attached to the central spread rope 15 is paid out causing the central spread rope 15 to bow, thereby reducing the distance between the innermost seismic sources 4.

FIG. 3 illustrates another embodiment of the invention where the rig is configured for performing ocean bottom seismic surveys, where no streamers are required. In this case the rig must be capable of being controlled so that the seismic sources 4 can be aligned with sensors on the seabed. The embodiment differs from the embodiment illustrated in FIG. 2 in that streamers for picking up the seismic signal are not required, so instead of the outer spread stop being connected to a stopper 13 it is connected to line block 9 and the line to which the line block 9 is attached has a diverter vane 12 attached to the free end thereof.

Figure 4:
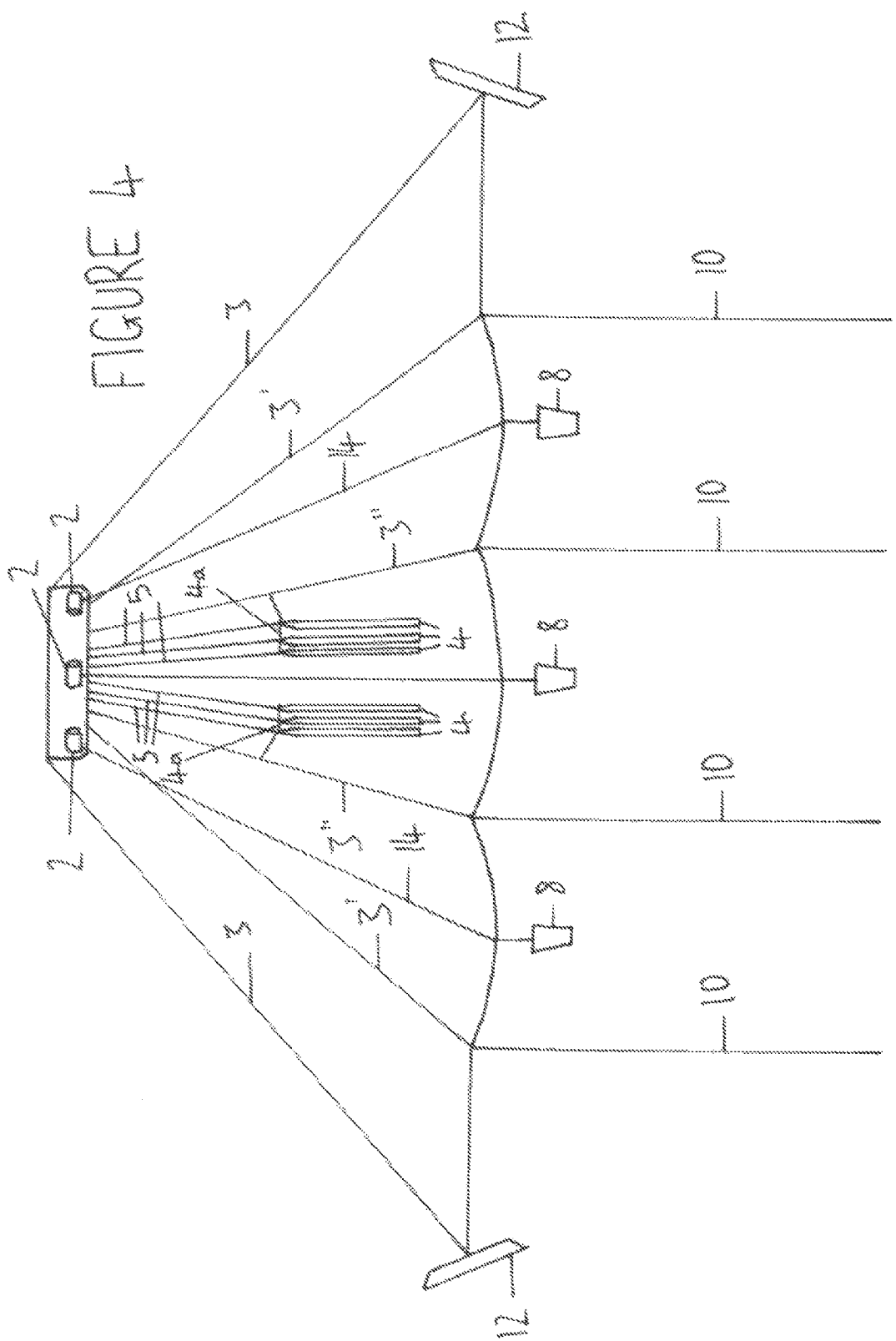

FIG. 4 illustrates another embodiment of the invention where the rig includes multiple streamers following on behind the source array. Each group of seismic sources 4 is attached to a streamer cable, and by virtue to the attachment of these streamer cables to the other cables in the rig, controlling the drag exerted by the drag devices 8 not only positions the streamer cables, but also positions the seismic sources 4.

The rig comprises wide tow ropes 3 to each side of the vessel V, and inwardly thereof, tow ropes 3' and 3". Two seismic sources 4 are towed off the vessel V by gun umbilicals 5. The outer-most seismic source 4 is attached to the inner tow rope 3" by a spread rope 7. The wide tow ropes 3 extend to diverter vanes 12 and a streamer spread rope 11 extends between the diverter vanes 12. Streamer ropes 10 extend from the streamer spread rope 11 at the points where the intermediate and inner tow ropes 3', 3" attach to the streamer spread rope 11.

Three drag devices 8 are attached to the streamer spread rope 11. As with the previously described embodiments a cable 14 attached to the winch 2 is attached to each drag device 8 so that each drag device 8 may be controlled independently of the other. As will be appreciated from the foregoing description of the drag devices 8 and their control, it is not only possible to steer the whole rig to the left and right of the centre line of the vessel V, but it is also possible to bring adjacent streamer ropes 10 closer together. Of course, by increasing the drag force on the central drag device, the two groups of seismic sources can also be brought closer together. If each of the winches is paid out at the same time, the spread rope 11 will bow between each of the streamer ropes 10 thereby reducing the distance between all of the streamer ropes. If the winches 2 pay out different amounts of rope 14, the streamer ropes 10 will be brought together, but by different amounts.

Figure 5:
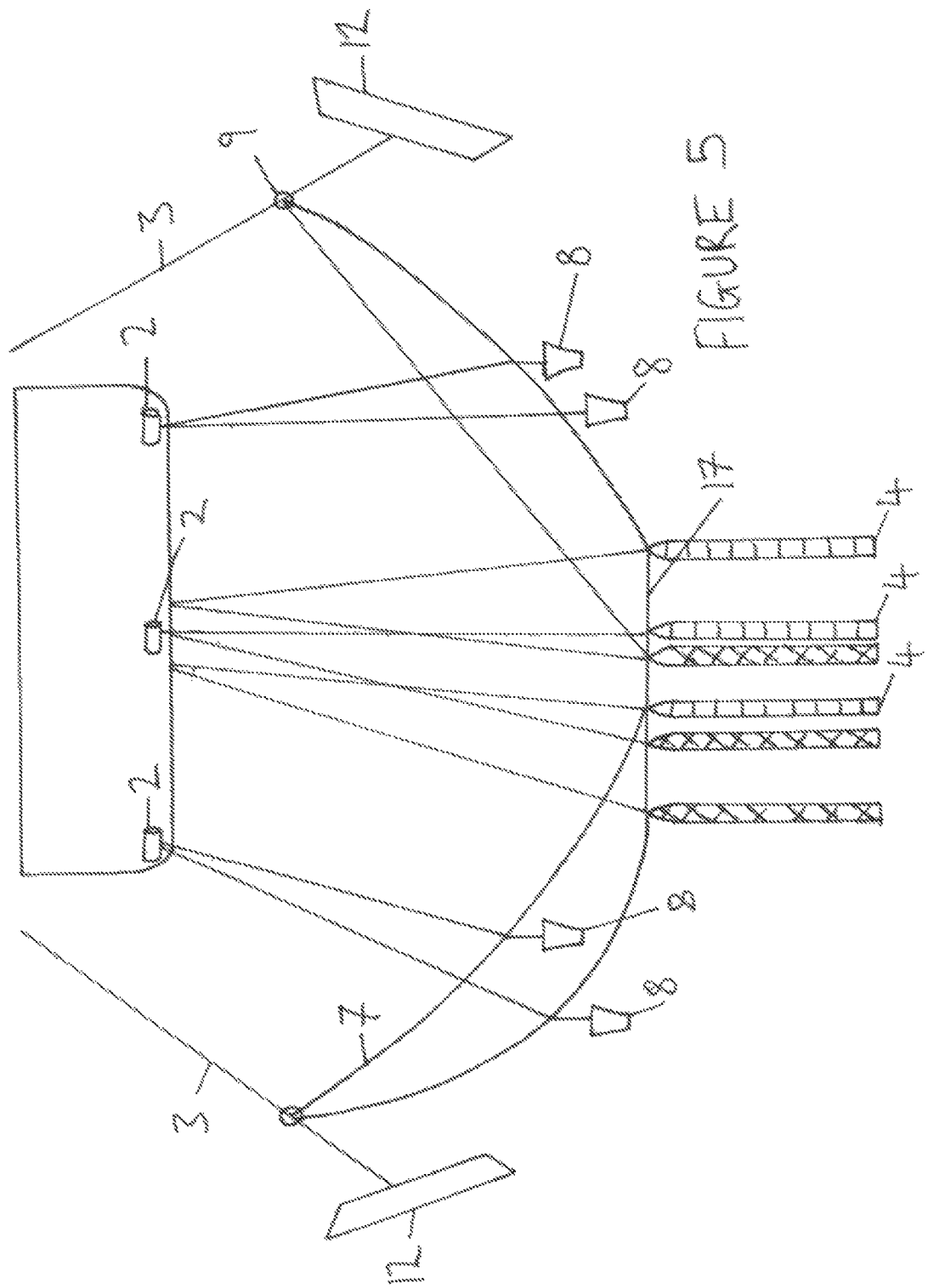

FIG. 5 illustrates a further embodiment of the invention where a single group of seismic sources 4 is towed behind a vessel V. The seismic sources 4 are attached to a central spread rope 17, which itself is attached to two outer spread ropes 7. The outer spread ropes 7 extend to line blocks 9 mounted on the outer tow rope 3. The end of each tow rope 3 is attached to a diverter vane 12. FIG. 5 illustrates the effect of paying out control cable 14 from the left hand winch 2. The spread rope 7 bows, decreasing the distance between the outer tow rope 3 and the group of seismic sources 4, thereby moving the group of sources away from the centre line to the left. As with the embodiment shown in FIGS. 2 and 2a, by reeling in the control cable 14 the seismic source 4 will mover to the left.

Figure 6:
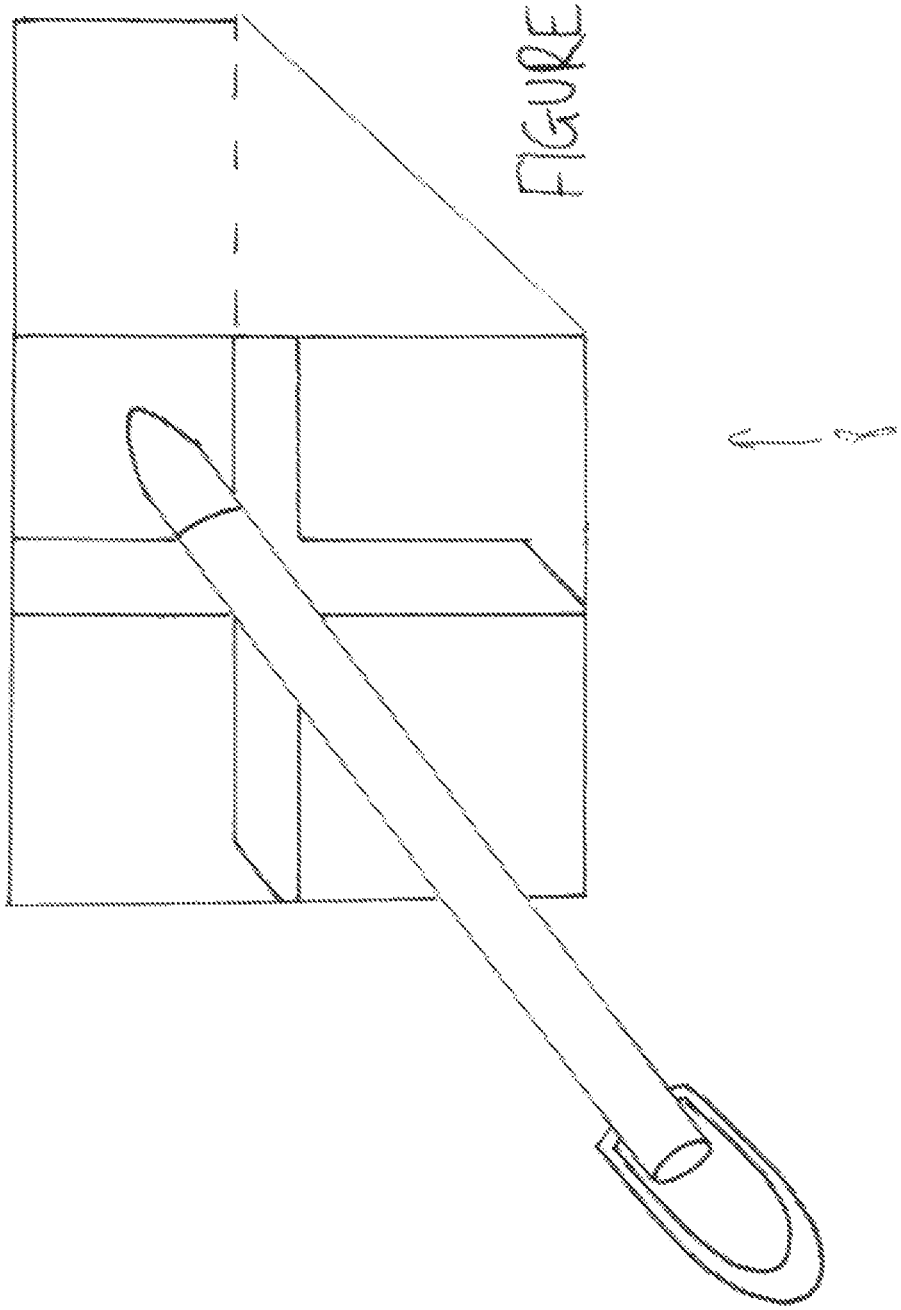

FIG. 6 illustrates the drag device 8, which is a self stabilising drogue. The drogue comprises an outer wall 20 that has an opening 20a at its front (inlet) end that is bigger than the opening 20b at its rear (outlet) end. It is by forcing water entering the opening 20a to exit through the smaller opening 20b that drag is created. Brace members 20c, 20d extend across the opening 20a perpendicular to one another. A towing pole 22 is attached to the brace members 20c, 20d and is provided with a towing eye at its free end. The rope 14 is attached to this towing eye.

The vessel towing the apparatus is equipped with navigation equipment that is programmed with or is connected with data representing the location of previous surveys. The vessel is navigated through this location and the survey tools need to position such that the survey can be conducted to within one meter of the previous survey. In the case of seismic surveying, the primary and where required the secondary survey tools need to be in the desired location for the next firing sequence of the primary survey tools.

As the vessel and apparatus are navigated through an area to be surveyed, the apparatus is steered by adjusting the winches so as to move the survey tools to the desired position.

In order that the current position of the sources 4 and the streamers may be established, either or both of these pieces of equipment are provided with position locators, which may be GPS position locators.

In this specification certain elements are referred to as elongate flexible elements, ropes, cables and chains. These terms are interchangeable in that an elongate flexible element that is a cable may be replaced by a chain or a rope and vice versa.

The apparatus also includes a controller, which issues signals for adjusting the length of the cable to which the drag device is attached. The controller receives signals from the position locators on the sources 4/streamers and desired positions for these pieces of equipment from a navigation system. The controller issues signals that either control the winches or that allow the winches to be controlled to bring the rig into the desired position.

Figure 7:
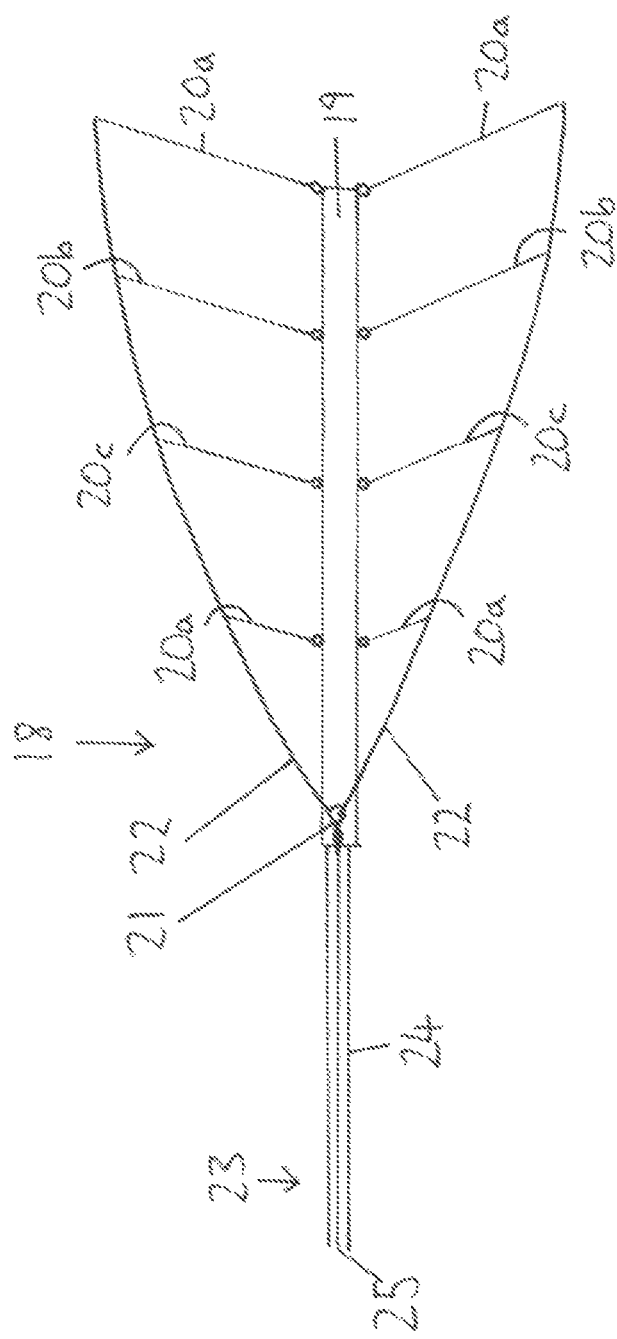
FIG. 7 is a schematic representation of an alternative embodiment of a drag device.

FIG. 7 illustrates an alternative embodiment of the invention. Instead of the drag device 8 being of a fixed size and shape, and hence generating a substantially fixed drag, the drag device 18 is of construction that variable in its configuration so that the drag effect of the drag device 18 may be varied. The drag device is in the form of a drogue 18 which comprises a central member 19 to which four sets of paddles 20a to 20c are pivotally mounted. A flexible element in the form of a rope or chain 22 is attached to each of the sets of paddles 20a to 20c. The flexible element passes around a pulley 21 that is slid ably mounted on the central member 19. A Bowden cable 23 or similar is attached to the central member 19. As will be understood by those skilled in the art, a Bowden cable has an outer case in which an inner cable may slide. In the present case, the inner cable 25 is attached to the pulley 21 to move the pulley 21 in the longitudinal direction of the member 19 to move the paddles 20a to 20c between a maximum drag position where they extend substantially parallel to the longitudinal axis of the member 19 and a minimum drag position where the paddles extend substantially parallel with the longitudinal axis of the member 19. The outer case 24 of the Bowden cable 23 attaches to one of the spread ropes, and extends to the vessel. The inner cable 25 extends to the vessel and is controllable therefrom. The inner cable may be attached to a winch or capstan or other means that allows the cable to be pulled towards or pulled away from the vessel. Instead of or in addition to the Bowden cable, the drag device 18 may be attached to the spread rope by a flexible element of substantially fixed length, such as a rope or chain extending between the spread rope and the drag device.

Broad Scope of the invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language of the present invention or inventions should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

While in the foregoing we have disclosed embodiment of the invention in considerable, it will understood by those skilled in the art that many of these details may be varied without departing from the spirit and scope of the invention.

The invention claimed is:

1. A marine survey apparatus comprising a plurality of cables towed by a vessel, the plurality of cables including two deflected tow cables each connected to the towing vessel; at least one primary surveying tool attached to a cable, the cable having a fixed length and being attached to the towing vessel and at least one spread rope, wherein the deflected tow cables are connected to one another by the at least one spread rope, wherein the apparatus further comprises at least one water engaging drag device, the at least one water engaging drag device being attached to and trailing behind the at least one spread rope, an elongate flexible member extending between the vessel and the at least one water engaging drag device, said elongate flexible member having a length, wherein the survey apparatus includes a control means for controlling the length of said elongate flexible member and the drag device attached thereto, the survey apparatus being steerable by controlling said length of the elongate flexible element to position the at least one survey tool in a desired location by controlling the length of the elongated flexible member affixed to each of the at least one water engaging drag device.

2. A marine survey apparatus according to claim 1, comprising at least two drag devices attached to the at least one spread rope at spaced apart locations between the deflected tow cables.

3. A marine survey apparatus according to claim 1, wherein each elongate flexible element is attached to a winder mounted on the vessel.

4. A marine survey apparatus according to claim 3, wherein the cable winder is one of: a winch, a capstan and a windlass.

5. A marine survey apparatus according to claim 1, wherein the elongate flexible element is attached to a coupling that is slidably mounted on the vessel, which vessel has a stern, and wherein sliding of the coupling changes the length of the elongate flexible element between the stern of the vessel and the at least one water engaging drag device.

6. A marine survey apparatus according to claim 1, wherein the elongate flexible element is one of: a rope, a cable and a chain.

7. A marine survey apparatus according to claim 1, wherein the at least one water engaging drag device is one of a drogue and a sea anchor.

8. A marine survey apparatus according to claim 7, wherein the at least one water engaging drag device is of a fixed configuration.

9. A marine survey apparatus according to claim 7, wherein the at least one water engaging drag device is of a variable configuration, providing a variable amount of drag.

10. A marine survey apparatus according to claim 9, wherein the elongate flexible member is a Bowden cable, the Bowden cable including an outer case and an inner slidable element, and wherein the inner slidable element is operatively connected to the at least one water engaging drag device to vary the configuration thereof.

11. A marine survey apparatus according to claim 1, further comprising two primary surveying tools, wherein the primary surveying tools are spaced apart and wherein a drag device is situated between the two primary surveying tools.

12. A marine survey apparatus according to according to claim 11, comprising two sets of primary surveying tools, each set spaced apart from one another, the drag device situated between the two sets of primary surveying tools.

13. A marine survey apparatus according to claim 11, wherein at least some of the surveying tools are attached to each other by a spread rope.

14. A marine survey apparatus according to claim 11, and comprising a plurality of tow cables each attached to the towing vessel and a spread rope.

15. A marine survey apparatus according to claim 1, wherein the apparatus includes at least one secondary surveying tool, the at least one secondary surveying tool attached to one of the tow ropes and the at least one spread rope and wherein the at least one secondary surveying tool is towed behind the primary surveying tool.

16. A marine survey apparatus according to claim 15, wherein the survey apparatus is a seismic survey apparatus and wherein the primary survey tool is a sonar source and the secondary survey tool is a sonar sensor.

17. A marine survey apparatus according to claim 1, further comprising a controller configured to input control signals to the control means.

18. A marine survey apparatus according to claim 17, wherein the controller is configured to receive signals from a navigation system.

19. A marine survey apparatus according to claim 16, further comprising position locators associated with at least one of the sonar source and the sonar sensor.

20. A method of conducting a marine survey using a marine survey apparatus according to claim 1, the method comprising the steps of:
1) navigating a vessel towing the marine survey apparatus through a previously surveyed area;
2) inputting position information from a previous survey into the controller;
3) controlling the control means to adjust a length of the elongate flexible element between the drag device and the stern of the vessel, to position the survey tools in a desired location.

* * * * *